Oct. 4, 1966     A. A. DUFF ETAL     3,276,847
TUBULAR DROPPER FOR MICRO-TITRATION
Original Filed Aug. 31, 1961     5 Sheets-Sheet 1
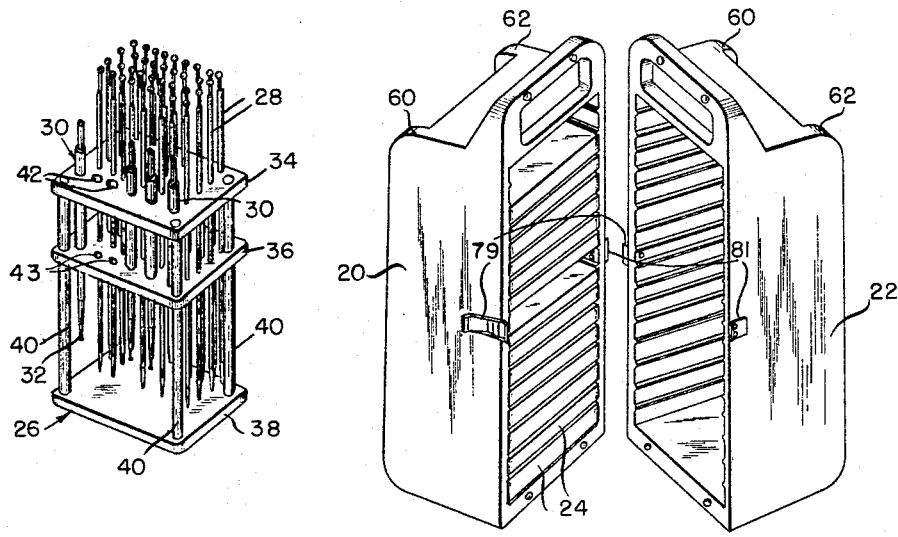
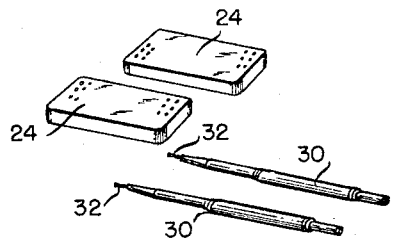
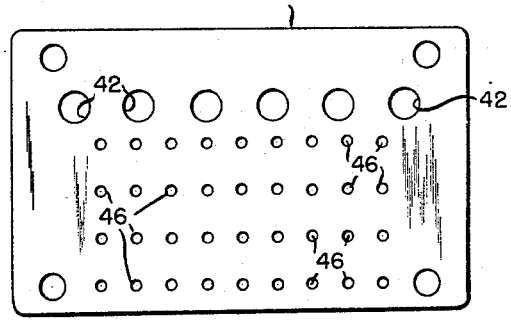
Fig.1
Fig.1A
Fig.1B
INVENTORS
Alan A. Duff
Norman G. Hayward

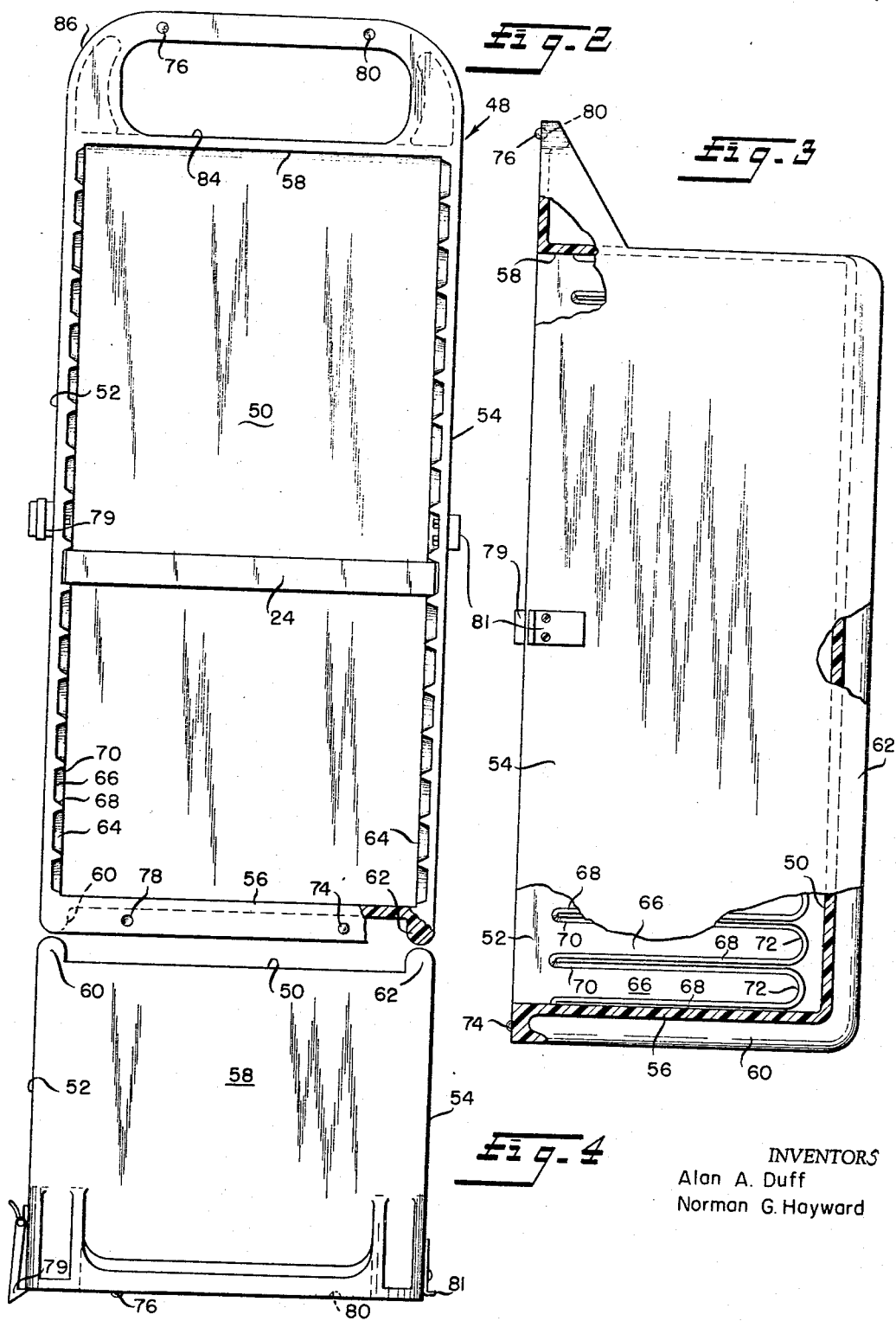

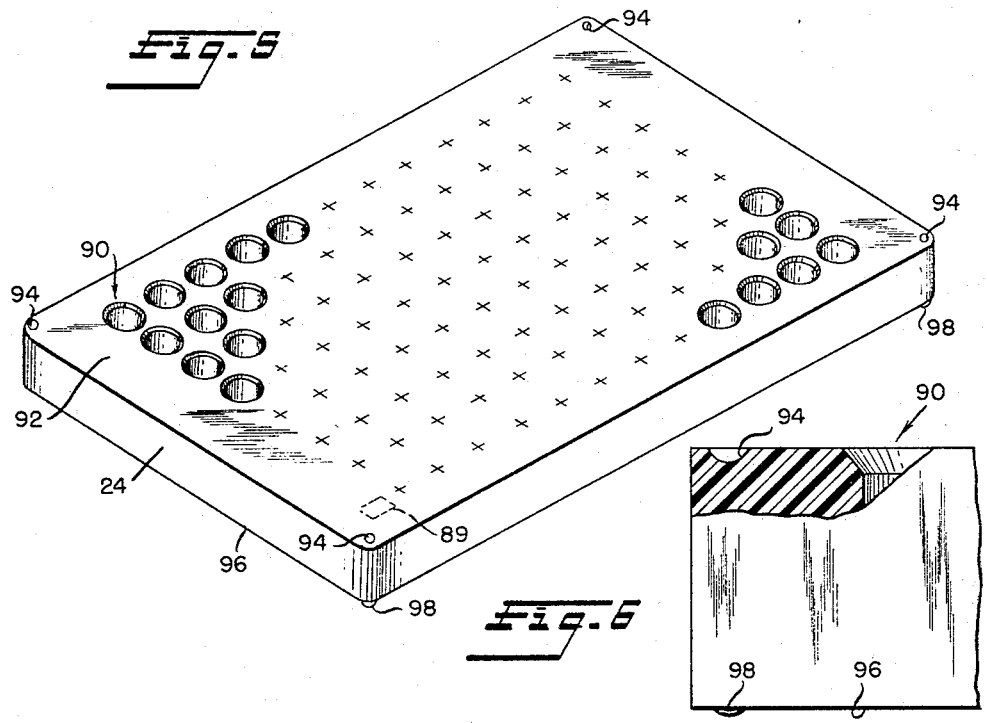
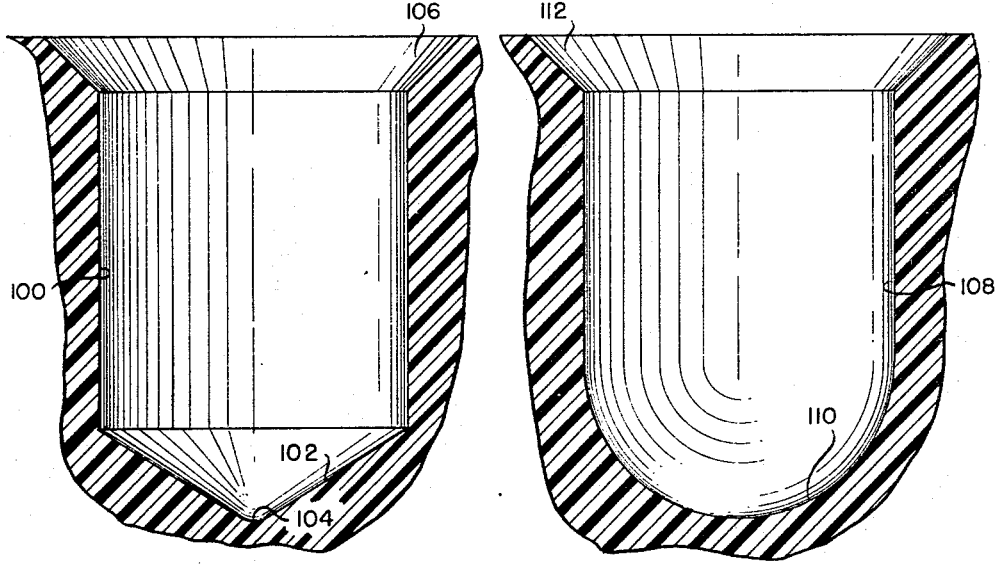

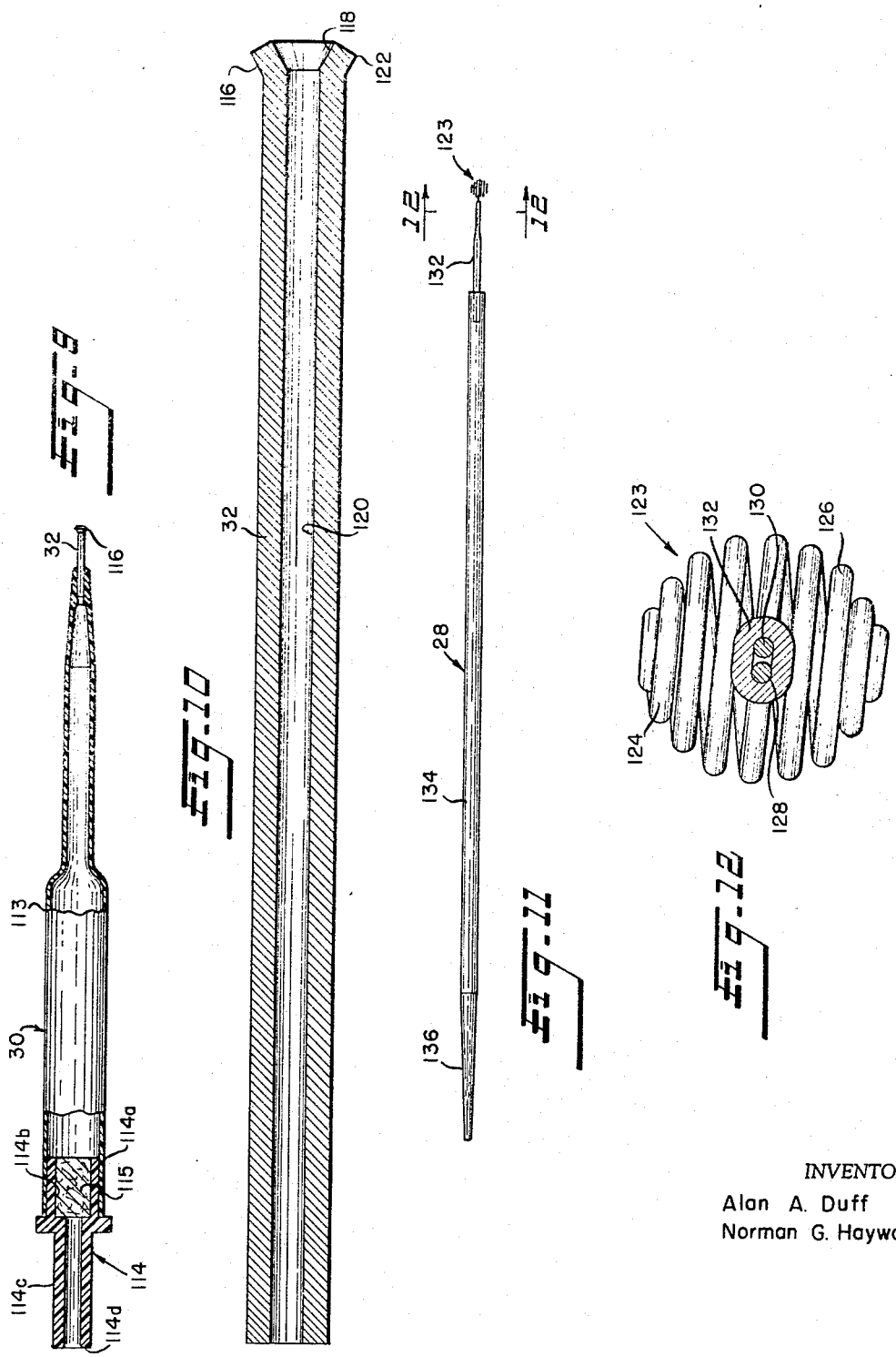

INVENTORS
Alan A. Duff
Norman G. Hayward

United States Patent Office 3,276,847
Patented Oct. 4, 1966

3,276,847
TUBULAR DROPPER FOR MICRO-TITRATION
Alan A. Duff, North Springfield, and Norman G. Hayward, Alexandria, Va., assignors to Cooke Engineering Company, Alexandria, Va., a corporation of Delaware
Original application Aug. 31, 1961, Ser. No. 135,364. Divided and this application Sept. 8, 1964, Ser. No. 400,298
5 Claims. (Cl. 23—292)

This application is a division of copending application Serial No. 135,364 filed August 31, 1961 for Titration Apparatus.

The present invention relates to improvements in titration apparatus and more particularly to improvements in microtitration apparatus.

Microtitration apparatus, as heretofore available, has embodied a plurality of transparent plexiglass plates, a plurality of wire diluting loops, and a plurality of glass pipette-hypodermic droppers. The plexiglass plates have been formed by cutting large sheets of rolled plexiglass into plates approximately 30 x 70 x 8 millimeters and thereafter drilling one large face of each plate unit with seventy-two cups arranged in six rows of twelve cups each. As previously formed, each cup had a cylindrical wall in the order of six millimeters in diameter and a wide angle conical bottom, and a working capacity in the order of 0.075 milliliter. The recesses were formed by drilling in the plate plexiglass material. The wire diluting loops are tightly wound spirals which are closed at each end and have a capacity of either 0.025 millilter or 0.05 milliliter. Each loop is attached to a metal shaft. The pipette droppers are intended to deliver drops of .025 milliliter.

In using this equipment for titration purposes, the cups of a plate are filled with like amounts of a diluent by depositing a given number (normally one or two) of drops in each with the glass pipette-hypodermic dropper, a number of loops equal in number to the number of cups in the plate are filled by dipping in the desired liquid, care being taken to avoid the inclusion of bubbles, the loops each placed in the first cup of their respective row and rotated to thoroughly intermix the desired liquid with the diluent, the loops then removed and inserted in the second cups and mixed and so forth down the entire row to thereby provide progressively decreasing concentrations of the desired material down each row of cups. Since the volume used of both diluent and the desired material are very small, it is extremely important that these volumes be accurately measured if acceptable results are to be obtained.

The equipment as heretofore available has had many disadvantages. There has been a wide variation in the thickness of the plexiglass plates and in the configuration of the cups as well as the surface quality of the side wall of the cup.

The use of sheet material as stock in forming the plates has resulted: (a) in lack of uniformity in the dimensions of the plate units due to the wide tolerances on thickness of commercially available sheet stock and inaccuracies in cutting the plate units, and (b) in unacceptable surface qualities on both the exterior surfaces of the plate units and on the internal surfaces of the cups. The external surfaces of the plate units and the side walls of the cups, when bearing tool marks as heretofore, interfere seriously with the ability of a technician to visually inspect the contents of the cups and the deposits therein either directly or with a microscope.

In addition, the equipment heretofore available for microtitration purposes has, unfortunately, not been capable of metering the fluids accurately and consistently. The deficiencies of the available equipment have to a large extent been responsible for the fact that, despite the inherent advantages of microtitration techniques in savings of time and materials, such techniques have achieved only limited acceptance.

The pipette droppers have not produced accurately calibrated drops as marketed but have required individual calibration by the user by filing the needle tips. Such individual user calibration is expensive in loss of time by highly trained and skilled research technicians and of limited accuracy even with the most painstaking work.

Further, the equipment as heretofore available has not provided adequate storage facilities for the plates utilized in this equipment. The surfaces of the plates may become scratched during storage and the storage racks for the equipment have not been constructed in the manner to permit their sterilization.

With the foregoing considerations in view, it is the primary object of this invention to provide improved microtitration apparatus in which each of the component parts is constructed to provide consistent and reliable results.

In furtherance of the foregoing object, the present invention has the following individual and collective objects:

(1) To provide an improved casing for the components of microtitration apparatus in which the case is so formed that:

(a) The microtitration plates are supported along their edges without contact between the case and any surface of the rectangular plates to thereby prevent scratching or otherwise marring the optically polished surfaces of the plates during storage, (b) The case may be readily cleaned and sterilized to prevent plate contamination during storage, (c) The case may be utilized as a plate support rack during washing and sterilization of the plates, (2) To provide improved microtitration plates for microtitration apparatus in the form of a flat transparent plastic body of consistently uniform dimensions and having a plurality of recesses formed in one face thereof to a consistently uniform constant depth so that consistent and reliable visual readings of the contents of the recesses can be made.

(3) To provide a microtitration plate having a plurality of cylindrical recesses formed in one face thereof normal to said face and terminating in substantially conical end walls in which the cylindrical wall is a polished surface and in which the substantially conical end wall is a vapor blast finish whereby particles settling upon said end wall will tend to remain on said end wall at the point of initial contact therewith.

(4) To provide a microtitration apparatus having a plurality of microtitration plates some of which have conical end recesses and others of which have hemispherical end recesses whereby such apparatus is rendered generally applicable to a wide variety of tests such as complement fixation, hemagglutination, hemagglutination inhibition and metabolic inhibition tests.

(5) To provide an improved pipette dropper having an accurately formed and dimensioned drop forming surface to provide drops of accurately predetermined volumetric capacity.

(6) To provide a pipette dropper consisting of a tubular shaft terminating in an outwardly conically flared discharge end on which is formed a frustoconical drop forming surface of a predetermined accurately dimensioned area to form a drop of predetermined volumetric capacity.

(7) To provide a set of wire diluting spherical loops for microtitration apparatus in which the ends of the loop supporting shafts or stylus remote from the loops are accurately frusto conically tapered relative to the length of such shafts and the spacing between adjacent rows of cups in the associated plates so that a plurality of the loops may be held in one hand at their tapered ends and their loops will be properly spaced for direct insertion into a transversely aligned groups of cups in one of the associated microtitration plates and thereafter rotated to effect the dilution.

These and other objects of the present invention will become more fully apparent by reference to the appended claims and as the following detailed description proceeds in reference to the accompanying drawings wherein:

FIGURE 1 is a perspective view of the microtitration apparatus constructed in accord with the present invention;

FIGURE 1A is a plan view of the upper one of the plates of the stand of the apparatus of FIGURE 1;

FIGURE 1B is a plan view of the intermediate one of the plates of the stand of the apparatus of FIGURE 1;

FIGURE 2 is a front view of one of the two identical casing halves of the apparatus of FIGURE 1;

FIGURE 3 is a right side view of the casing half shown in FIGURE 2;

FIGURE 4 is a top plan view of the casing half shown in FIGURE 2;

FIGURE 5 is a perspective view of one of the microtitration plates of the apparatus of FIGURE 1;

FIGURE 6 is a fragmentary side elevational view, partially in section, of a corner of the plate of FIGURE 5;

FIGURE 7 is a diametral sectional view through one of the cups or recesses of one of the two forms of plates of the apparatus of FIGURE 1;

FIGURE 8 is a diametral sectional view through one of the cups of the other form of plate of the apparatus of FIGURE 1;

FIGURE 9 is a plan view, partially in section, of a plastic pipette dropper assembly of the apparatus of FIGURE 1;

FIGURE 10 is a greatly enlarged longitudinal sectional view through a dropper of the apparatus of FIGURE 9;

FIGURE 11 is a plan view of one of the diluting loops of the apparatus of FIGURE 1;

Figure 13:
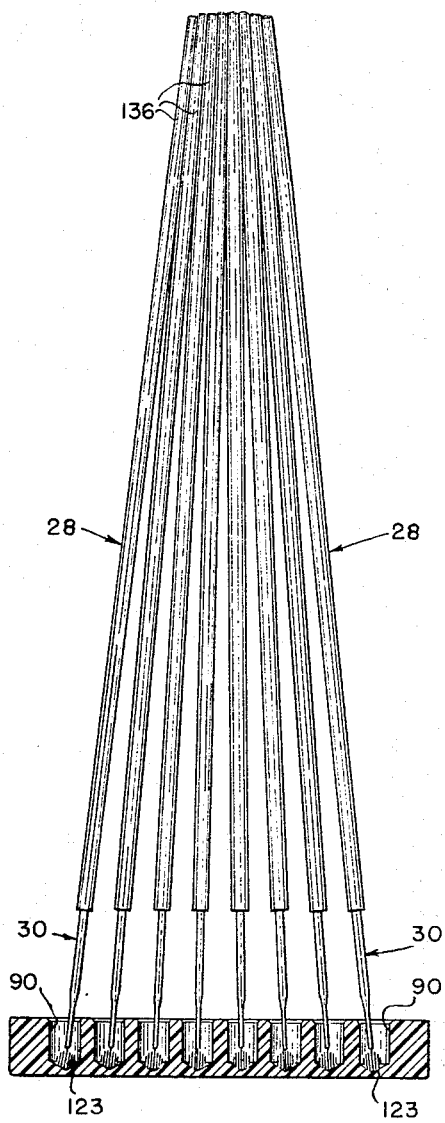

FIGURE 12 is an enlarged sectional view taken substantially along the line 12—12 of FIGURE 11; and FIGURE 13 is a diagrammatic view, illustrating the manner in which the taper on the ends of the shafts or stylus of the several loops is correlated with the spacing between the cups in the plates so that when a group of the loops is held together in one hand the wire loops are properly spaced for insertion into the cups without further adjustment but without inhibition of their individual rotation.

Referring now to the drawings and particularly to FIGURE 1, the microtitration apparatus of the present invention comprises a pair of casing halves 20 and 22 which are identical and each of which is formed as shown in FIGURES 2, 3 and 4. One of the casing halves such as 20 normally houses sixteen microtitration plates 24, eight of which have recesses of the form shown in FIGURE 8. The other half 22 of the casing is adapted to receive and house the stand 26 which supports the wire loops 28, the plastic pipette dropper assemblies with their droppers 30 and 32 when not in use.

The stand 26 comprises two plates 34 and 36 of the form shown in FIGURES 1A and 1B respectively and an imperforate base plate 38 all of which are rigidly interconnected and maintained in parallel relation by corner posts 40 to which they are suitably permanently fixed.

When the apparatus is to be used, the stand 26, together with the components supported by it, is removed from the casing half 22. The two casing halves 20 and 22 may then both be used for storage of the plates 24 or as wash racks for plates 24 as will be explained presently.

Referring again to FIGURES 1A and 1B, the plates 34 and 36 are formed with vertically aligned rows of six pipette dropper assembly receiving apertures 42 and 43, and a plurality of rows of loop shaft receiving apertures 46 to provide firm support for each of these elements when placed in the stand 26 to prevent damage from their contact with one another or with the casing half during storage. The stand 26 is made of clear polypropylene or anodized aluminum, the plates 34 and 36 being .25 inch thick, 5.300 inches long and 3.25 inches wide. The stand 26 with the loops 28 and pipette dropper assemblies may be autoclaved without damage.

Referring now to FIGURES 2, 3 and 4, the casing halves 20 and 22 are each a molded one piece plastic body 48, having a back wall 50, parallel side walls 52 and 54, a bottom wall 56 and a top wall 58, all of which are imperforate. On the exterior of the bottom wall 56 and the back walls 50, are formed continuous integral edge rails 60 and 62 which support the bottom and back walls 56 and 50 to prevent their contacting and sticking to a wet surface upon which the casing half may be placed. The plastic bodies 48 of casing halves 20 and 22 are both made of polypropylene (preferably milky white to render the case opaque) so that the entire casing may be autoclaved. For appearance purposes, the material of which plastic bodies 48 are cast should resist discoloration from sodium hydrochlorite, 10% and formaldehyde, 5%.

The interior surfaces of the walls 52 and 54 are formed with seventeen directly opposed and aligned pairs of grooves 64. Grooves 64 have flat end walls 66, inclined divergent bottom and top walls 68 and 70, and curved end walls 72 as is shown in FIGURE 3. The number of pairs of grooves 64 exceeds the number of plates 24 by one so that there is always a space in which one may insert one's fingers to grasp one of the plates. This is conveninet when it is desired to store the plates 24 in two separate groups for reference purposes.

Each opposed pair of recesses in the side walls 52 and 54 is adapted to support one of the plates 24 as is shown in FIGURE 2. As is there shown, when a plate 24 is inserted into an opposed pair of recesses 64, the surfaces 70 and 68 of the recesses 64 support the plate 24 along the junctures of its side surfaces with its top and bottom surfaces so that its side, end and top and bottom surfaces do not contact, in surface to surface contact, the end walls 66 or the recesses 64. The curved surfaces 72 of the recesses 64 prevent the plates 24 from contacting the back walls 50 of the casing body 48. By this construction the highly optically polished surfaces of the plates 24 are protected from scratching contact with their casing and one another during storage within the casing halves 20 and 22.

The vertical location and thickness of the plates 34, 36 and 38 of stand 26 is such that the edges of those plates engage recesses 64 of the casing half in which stand 26 is placed during storage or transportation of the apparatus to firmly support stand 26 and the components supported thereby.

The casing halves 20 and 22 in addition to forming a storage facility for the plates 24 are designed for utilization as a wash rack for these plates. For this purpose, the plates 24 are placed in alternate ones of the opposed pairs of recesses 64 to provide passages sufficiently large for free flow of washing fluid between adjacent plates 24 and between the plates 24 and the end wall 50 of the casing body 48. When necessary, the plates being so spaced, a brush can be inserted between adjacent plates to clean out the cups of the plates. The casing half body 48 is formed of polypropylene so that it can be autoclaved with heat resistant plates 24 in place within it or independently to assure its sterility when heat resistant plates 24 are not available.

The casing body 48 is formed with projecting lugs 74 and 76 and recesses 78 and 80 so that when the two casing halves 20 and 22 are assembled together, the lug 76 of the casing half 20 will interfit in piloting relation in the recess 80 of the casing half 22, the lug 76 of the casing half 22 will similarly interfit in the recess 80 of the casing half 20, the lug 74 of the casing half 20 will similarly interfit within the recess 78 of the casing half 22 and the lug 74 of the casing half 22 will interfit in piloting relation within the recess 78 of casing half 20 to thereby maintain alignment between the casing halves 20 and 22 when assembled together. For transportation purposes, the two halves 20 and 22 are locked together by any suitable symmetrical locking mechanism such as spring catches 79 and co-operating strikes 81.

The bodies 48 of the casing halves 20 and 22 are each formed with through apertures 84 through the upwardly projecting top flange 86 to form a handle by which the entire apparatus may be carried when the two casing halves 20 and 22 are connected together and a convenient handle by which each casing half 20 and 22 may be handled when it is being used for storage or wash rack purposes.

Since the casing halves 20 and 22 are identical, the casing halves of one apparatus may be interchanged at will with those of a second and additional casing halves obtained for supplemental storage or wash rack purposes.

Turning now to FIGURES 5, 6, 7 and 8, as has been previously indicated, the present apparatus includes a total of sixteen molded transparent plastic plates 24, eight having cups of the form shown in FIGURE 7 and eight having cups of the form shown in FIGURE 8. The plates 24 are marked at 89 with molded indicia "V" or "U" to identify the plate as having recesses as shown in FIGURES 7 and 8 respectively. Each of the plates 24 is a molded body of plastic having a plurality of cups or recesses 90 arranged in eight rows of twelve each formed in the top surface 92 thereof. Each corner of the top surface 92 has a further but much smaller and more shallow recess 94 formed therein. On the bottom surface 96 of plate 24 at each corner and in direct alignment beneath the recesses 94 is formed a projection 98. The projections 98 form feet for the plate 24 to support its bottom surface 96 above the surface of any support upon which the plate 24 may be placed. This is desirable since plates 24 must be shifted back and forth over their support surface to agitate the contents of cups 90 in certain tests. This has resulted in scratching of the optically polished bottom surface 96 with decreased useful life of the plates in prior art plates. In addition, projections 96 are adapted to interfit within the recesses 94 of another plate 24 to permit stacking of a group of the plates 24 in interlocking relation to prevent them from sliding relative to one another. The projections 98 are sufficiently smaller than recesses 94 to prevent their sticking together when so stacked. The molded plates 24 in one practical embodiment of the invention are 5.080 inches long, 3.250 inches wide, and .50 inch thick. The center to center hole spacing within each row is .354 inch, and the center to center hole spacing between adjacent rows is .357 inch. The plastic of which the plates 24 can be made must be transparent. The presently preferred commercially available material is a clear acrylic resin such as Lucite No. 140 made by E. I. du Pont de Nemours & Co. or equal. This material is satisfactory for molding the plates 24 but will not withstand the heat of autoclaving. For this reason, the transparent thermo plastic polycarbonate resins marketed by the General Electric Company under the trademark "Lexan" are preferred due to their heat resistance but are not as readily available for commercial use. All exterior surfaces of the body plate 24 must have a highly optically polished surface quality in the order of one to four microinches for optimum results.

The necessary high surface quality and consistent close tolerances on dimensions are achieved by molding the plates 24 in carefully formed molds and utilization of the plates 24 in their as-cast form to eliminate the possibility of tool markings marring the surfaces.

Referring to FIGURE 7, the recesses 90 of the first group of plates each have a cylindrical wall 100, a conical end wall 102, a rounded tip 104 and a frusto conical entrance lip 106. The apex angle of surface 106 is in the order of 90°. The diameter of the cylindrical surface 100 is in the order of .236 inch. The apex angle of the surface 102 is in the order of 118° and the radius of the rounded tip 104 is in the order of .015 inch. The rounded tip 104 is very important in that it eliminates the possibility of trapped air bubbles at the apex of the conical surface 102. This is extremely important because the reading of the deposit upon surface 102 at the tip 104 may be the most critical in certain tests. The surface 102 must have a vapor blast or equal finish, in the order of 10 microinches. This finish in cooperation with the apex angle of the surface 102 assures that the particles deposited from the fluid within the cup upon the surface 102 will remain in the position in which they are initially deposited rather than sliding down the surface 102 to the tip 104 thereby producing an inaccurate or otherwise unuseable result. The finish of the surface 102 must however be such that the deposit upon the surface 102 may be readily visually inspected by the naked eye or microscopically from the bottom surface 96 or through any of the edge surfaces of the plate 24. The surfaces 106 and 100 must be highly polished, in the order of 1 to 4 microinches. The juncture of surface 100 with surface 102 must be a sharp corner to prevent the formation of rings of red cells on the conical wall adjacent its juncture with the cylindrical side wall as in the prior rounded corner constructions.

Referring to FIGURE 8, the remaining eight plates 24 of the set each have recesses 90 of the form shown in FIGURE 8 in which each recess has a cylindrical wall 108, a hemispherical end wall 110 and a frusto conical inlet lip 112. In this embodiment surfaces 108, 110 and 112 are all highly polished (in the order of 1 to 4 microinches, surface 112 having an apex angle of approximately 90° to assure complete drainage into the cup, surface 108 having a diameter of .236 inch and surface 110 having a like diameter.

The depth of the recesses 90 for both forms of plates are .410 inch. For accurate visual comparison of the contents of the several cups 90 of a given plate 24 through the bottom surface 96, it is of critical importance that the depths of all cups 90 be equal. A tolerance of ±.001" on the depths of holes of any given plate is maintained in the commercial embodiment of the invention.

The inclusion in the apparatus of FIGURE 1 of plates 24 having recesses in the form shown in FIGURE 8 permits the use of the microtitration apparatus for complement fixation tests, metabolic inhibition tests and the like as well as hemagglutination tests and hemagglutination inhibition tests to which the prior art devices were limited.

Referring to FIGURES 9 and 10, the plastic pipette dropper assembly 30 therein shown comprises a plastic pipette 113 of improved form, formed of polypropylene, a stainless steel (18–8) dropper 32 mounted in the outlet tip of the pipette, and a suction filter adaptor 114 mounted in the opposite end of the pipette. The pipette 113 has been designed to allow removal of fluids from standard 75 mm. test tubes by providing a small diameter (.250 inch O.D.) portion approximately 2.5 inches long adjacent dropper 32, to be easily cleaned and to hold a maximum quantity of fluid without impairing operation of the pipette by providing a large diameter barrel (.500 inch O.D.) for the remainder of its 5.50 inches over-all length. This unit is used for placing an accurate amount of diluent in each of the cups 90 of a plate 24. For this purpose it is essential that the droppers 32 produce an accurately metered drop of fluid which for the present purpose must be a drop of .025 milliliter with an accuracy of 40 drops ±1 dropper 1 ml. Dropper 32 is formed from No. 19 standard gauge stainless steel No. 304 type hypodermic stock having an outside diameter of .042" and an inside diameter of .027". Prior art droppers used for depositing drops of diluent in the cups of the microtitration plates were merely conventional needle stock cut diametrically across. Each dropper had to be individually calibrated by filing the tip to produce accurately metered drops. This was a time consuming and extremely expensive operation of such magnitude that accurately formed droppers have not herefore been available commercially. As a result, laboratory personnel are forced to calibrate the commercially purchased droppers before they can obtain accurate results. The present invention eliminates this difficulty by providing an outwardly flared tip 116 at the discharge end of the dropper 32 having a frusto conical surface 118 at the end of the bore 120 of the dropper 32. The surface 118 is the surface to which the fluid in the drop adheres by skin tension as the volume of the drop is being built up. So long as the surface area of the surface 118, the apex angle of surface 118 and the surface quality of surface 118 are constant, the volume of each drop formed at the discharge end of the needle 32 will be constant. For the present purposes the apex angle of the surface 118 is 60° and the tip of the flared end 116 is flared to an extent that the edge 122 has a diameter of .055 with an accuracy of +.001–.000. When so formed, the desired .025 milliliter drops will be formed with an accuracy of ±2½%. Needle droppers formed in this manner can be readily manufactured in volume within the required tolerances and adequate quality control procedures may be readily practiced. In actual practice, only the .055 inch dimension need be checked on each needle. Once the proper tooling is set up, if the .055 inch dimension is accurate, the other requirements will be met.

The suction filter adaptor 114 is formed of polypropylene and is provided with an externally tapered end surface 114a to allow a light press fit leak-proof seal between the pipette 113 and the adaptor 114 when installed as shown in FIGURE 9. The lower end of the adaptor 114 is designed with an open end ended chamber 114b to receive an axially porous disposable cellulose acetate filter cartridge 115. The upper end is formed at 114c for use as a mouth piece and to adapt to other standard suction devices such as that shown in U.S. Patent No. 2,866,340 issued December 30, 1958 to M. Goldberg. Adaptor 114 has a smooth finish on the end 114d to allow accurate finger control of the drop frequency through the dropper 32.

The loops 28 as shown in FIGURES 11 and 12 comprise a pair of wire springs 124 and 126 wound and assembled in back to back relation to form a spring loop 123 having a spherical profile, the ends 128 and 130 thereof being fixed within a tubular stainless steel ferrule 123 fixed in the lower end of the rigid aluminum alloy shaft or stylus 134. Springs 124 and 126 are formed of .014 inch diameter stainless steel annealed wire and the sphere which they define has a radius of approximately .078 inch. The free end of the shaft 134 is formed with a tapered tip 136. Tip 136 is a conical surface having a half apex angle of 2° 16' in one practical embodiment of the invention in which the over-all length of the rod 134 is 7.19 inches and its outside diameter is .125 inch.

The purpose of the tapered tips 136 on the loops 28 is illustrated in FIGURE 13. As is therein shown, when eight of the loops 28 are held together with their tapered tips 136 in line contact with one another, the spring loops 123 are accurately positioned above the centers of a transversely aligned set of cups 90, one in each row. By this arrangement, the laboratory technician can grasp a group of loops 28 in between the thumb and forefinger, hold them so that the spring loops 123 are properly positioned in alignment with the first of the cups 90 in each row, lower the spring loops 123 into those cups 90, spin the loops 28 about the axes of their shafts 134 to mix the fluid carried by the spring loops 123 with the diluent in the cups 90, lift the loops 28 as a group from the cups 90 and place them in the second set of cups 90 and so forth through all of the sets of cups. In this manner, multiple microtitrations can be rapidly and accurately formed so that the volume of liquid retained by the spring loop 123 will be the required volume within the required tolerances, in accord with conventional practice.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tubular dropper element adapted to have its discharge end dipped into a body of liquid for withdrawal by suction thereinto of a portion of the liquid in said body and for thereafter producing by return gravity flow a series of drops of liquid of precisely uniform minute volume in the order of a fraction of a milliliter, said dropper element having a discharge end which is in the form of a circular line formed by the intersection of a pair of coaxial surfaces of revolution, the inner one of which is outwardly flared and cone-like, said tubular dropper element having a through bore, said outwardly flared surface of revolution forming the terminal portion of said tubular element bore, the other of said surfaces of revolution extending at a substantial angle from the plane of said circular line toward the other end of said tubular dropper element so that during drop formation on said outwardly flared surface of revolution by said return flow the liquid within the drop being formed is isolated by said circular line formed by the intersection of said surfaces of revolution from any liquid of said body of liquid which may be adhering to said other surface of revolution whereby said outwardly flared surface of revolution constitutes the sole surface of said dropper element to which liquid forming a part of a drop can adhere during drop formation.

2. The dropper element defined in claim 1 wherein the apex angle of said cone-like surface is in the order of 60°.

3. The dropper element defined in claim 2 wherein the diameter of said circular line is in the order of .055 inch.

4. A dropper assembly comprising an elongated plastic barrel and a tubular dropper element, said elongated plastic barrel forming a liquid reservoir and interfitting in fluid tight relation with one end of said tubular dropper element and providing a passage from the interior of said reservoir into said tubular dropper element whereby, upon immersion of the other end of said tubular dropper element into a body of liquid, liquid may be withdrawn from said body of liquid through said tubular dropper element into said reservoir by suction and whereby thereafter liquid may return from said reservoir through said tubular dropper element to supply liquid to form successive drops at the discharge end of said tubular dropper element, said tubular dropper element being constructed to produce a series of drops of liquid of precisely uniform minute volume in the order of a fraction of a milliliter and having a discharge end which is in the form of a circular line formed by the intersection of a pair of coaxial surfaces of revolution, the inner one of which is outwardly flared and cone-like, said tubular dropper element having a through bore, said outwardly flared surface of revolution forming the terminal portion of said tubular dropper element bore, the other of said surfaces of revolution extending at a substantial angle from the plane of said circular line toward the other end of said tubular dropper element so that, during drop formation on said outwardly flared surface of revolution by said return flow, the liquid within the drop being formed is isolated by said circular line formed by the intersection of said surfaces of revolution from any liquid of said body of liquid which may be adhering to said other surface of revolution whereby said outwardly flared surface of revolution constitutes the sole surface of said dropper element to which liquid forming a part of a drop can adhere during drop formation.

5. The dropper assembly defined in claim 4 wherein said barrel has a first elongated section adjacent said tubular dropper element of external diameter in the order of one-fourth inch and of a length of about two and one-half inches and an elongated section substantially equal in length to said first elongated section and providing a large liquid capacity reservoir portion which has an external diameter in the order of one-half inch whereby said barrel has a large liquid retaining capacity into which a large proportion of the liquid within a standard 75 millimeter test tube may be withdrawn in a single operation.

References Cited by the Examiner

UNITED STATES PATENTS

| 1,662,682 | 3/1928 | Lloyd | 128—233 |
| 2,348,831 | 5/1944 | Mathis. | |
| 2,376,231 | 5/1945 | Cohn | 73—425.4 X |
| 2,800,253 | 7/1957 | Henderson | 141—24 X |

FOREIGN PATENTS

| 821,258 | 9/1937 | France. |

MORRIS O. WOLK, *Primary Examiner.*

DELBERT E. GANTZ, *Examiner.*

J. SCOVRONEK, *Assistant Examiner.*

UNITED STATES PATENT OFFICE
CERTIFICATE OF CORRECTION

Patent No. 3,276,847                      October 4, 1966

Alan A. Duff et al.

It is hereby certified that error appears in the above numbered patent requiring correction and that the said Letters Patent should read as corrected below.

Column 1, line 40, before "cups" insert -- rows of --; column 4, lines 35 and 36, for "conveninet" read -- convenient --; column 7, line 10, for "herefore" read -- heretofore --; line 53, for "123" read -- 132 --.

Signed and sealed this 22nd day of August 1967.

(SEAL)
Attest:

ERNEST W. SWIDER                      EDWARD J. BRENNER
Attesting Officer                      Commissioner of Patents